United States Patent [19]

Maxwell

[11] 4,433,501
[45] Feb. 28, 1984

[54] FISHING LURE RETRIEVING DEVICE

[76] Inventor: Gary G. Maxwell, 980 E. Dillman, Bloomington, Ind. 47401

[21] Appl. No.: 333,650

[22] Filed: Dec. 23, 1981

[51] Int. Cl.³ ............................................. A01K 97/00
[52] U.S. Cl. ..................................................... 43/17.2
[58] Field of Search ......................................... 43/17.2

[56] References Cited

U.S. PATENT DOCUMENTS

| | | | |
|---|---|---|---|
| 2,760,810 | 8/1956 | Smith | 43/17.2 X |
| 2,950,558 | 8/1960 | Karpes | 43/17.2 |
| 3,016,649 | 1/1962 | Ratcliff | 43/17.2 |
| 3,375,602 | 4/1968 | Clark et al. | 43/17.2 |
| 3,735,520 | 5/1973 | Jarrett | 43/17.2 |
| 3,783,546 | 1/1974 | Meyers | 43/17.2 |
| 3,922,810 | 12/1975 | Kelly | 43/17.2 |

FOREIGN PATENT DOCUMENTS

| | | | |
|---|---|---|---|
| 217597 | 6/1958 | Australia | 43/17.2 |
| 787621 | 6/1968 | Canada | 43/17.2 |

*Primary Examiner*—Nicholas P. Godici
*Assistant Examiner*—J. Reed Batten, Jr.
*Attorney, Agent, or Firm*—James D. Hall

[57] ABSTRACT

Device for retrieving a snagged fishing lure which is connected to the end of a fishing line and which includes a generally cylindrical body having a rod attached at one end and an open cavity at the other end. The body of the device has a slot in its side wall which receives the fishing line for guiding the body along the fishing line to the snagged lure. The cavity in the retrieving device body is adapted to accept the snagged lure so that the lure can be moved with the body for freeing the lure.

3 Claims, 7 Drawing Figures

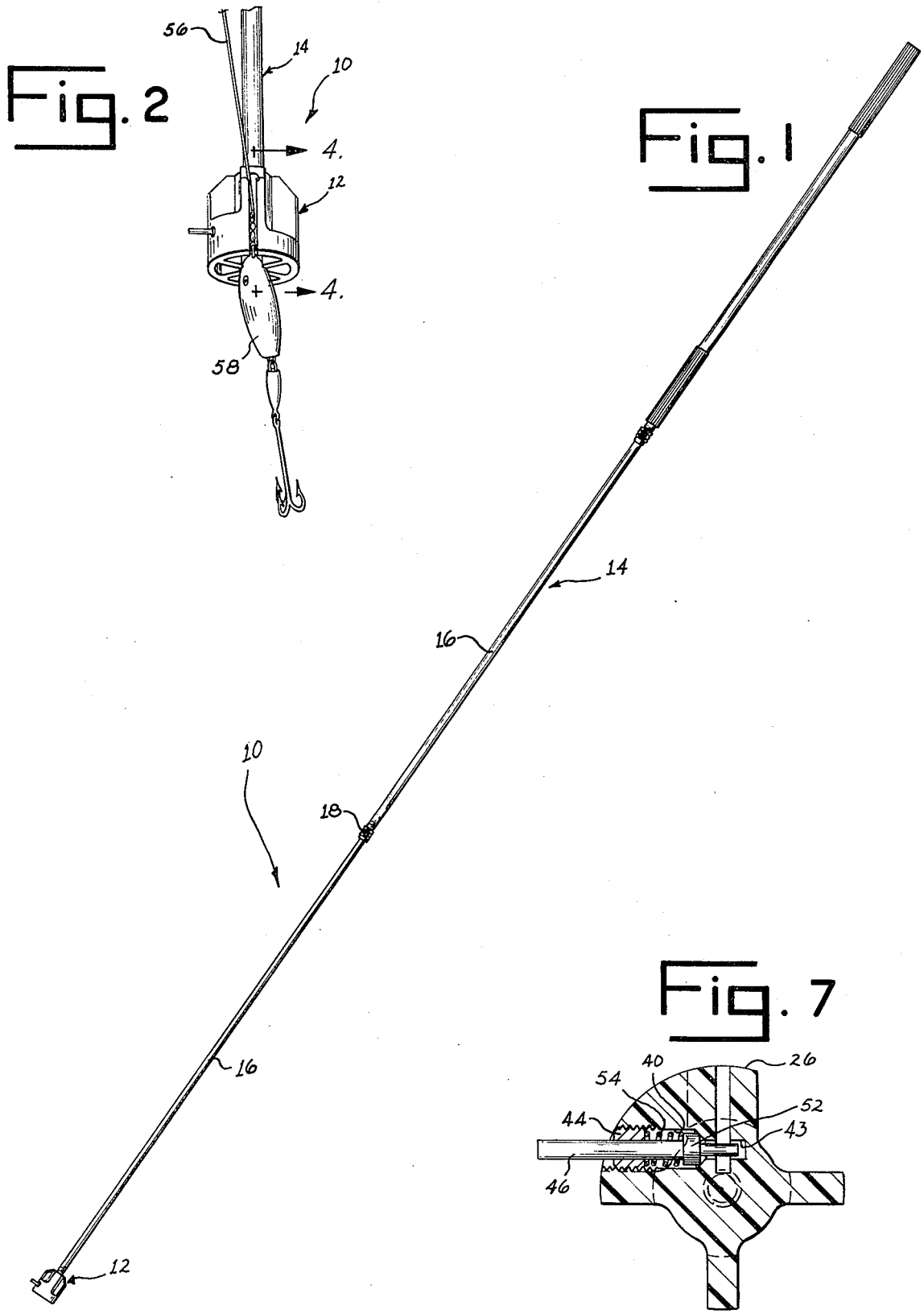

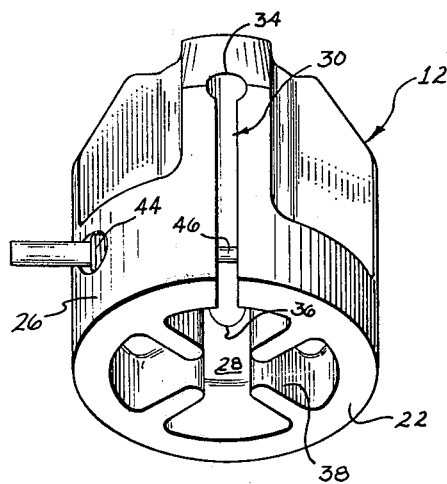
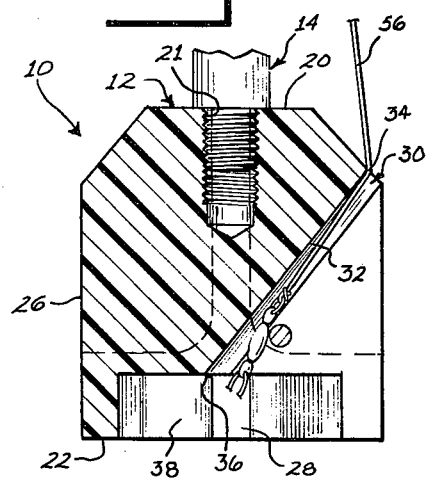
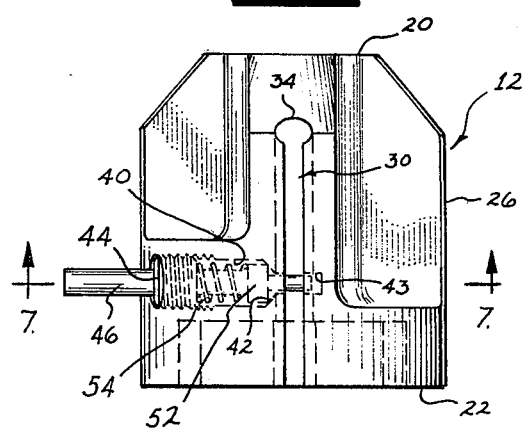
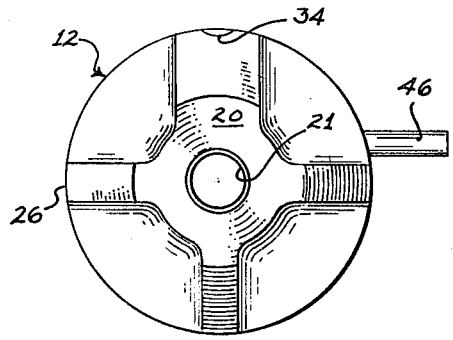

FISHING LURE RETRIEVING DEVICE

SUMMARY OF THE INVENTION

This invention relates to a fishing lure retrieving device.

The retrieving device includes a generally cylindrical body and an elongated rod connected at one end to the upper end of the body. A cavity is formed in the lower end of the body of the retrieving device and a slot extends along the side wall of the body into the cavity. The fishing line to which the snagged lure is attached is fitted into the body slot. A spring retainer secures the line within the body slot as the body of the retriever device is moved by the rod to the lure. The head of the lure fits into the body cavity where the lure may be moved with the body to free the lure.

It is an object of this invention to provide a device for retrieving a fishing lure attached to the end of a fishing line.

It is another object of this invention to provide a fishing lure retrieving device which may be used to manipulate the lure to free it from its snagged position.

Another object of this invention is to provide a retrieving device which may be guided along a fishing line to a snagged fishing lure at the end of the line by a rigid rod.

Other objects of this invention will become apparent upon a reading of the following description.

BRIEF DESCRIPTION OF THE DRAWINGS

FIG. 1 is a perspective view of the retrieving device.

FIG. 2 is a fragmentary perspective view of the retrieving device showing an attached fishing line having a lure at its end.

FIG. 3 is a perspective view of the body of the retrieving device as seen from the bottom.

FIG. 4 is a sectional view taken along line 4—4 of FIG. 2.

FIG. 5 is a side view of the body of the retrieving device.

FIG. 6 is a top view of the body of the retrieving device.

FIG. 7 is a cross sectional view taken along line 7—7 of FIG. 5.

DESCRIPTION OF THE PREFERRED EMBODIMENT

The preferred embodiment illustrated is not intended to be exhaustive or to limit the invention to the precise form disclosed. It is chosen and described in order to explain the principles of the invention and its application and practical use to thereby enable others skilled in the art to utilize the invention.

The retrieving device 10 of this invention includes a body 12 and a rod 14 attached at one of its ends to body 12. Rod 14 is preferably of the telescoping type having several sections 16 of progressively smaller diameter fitting within each other and secured to each other at their ends by locking nuts 18.

Body 12 is generally cylindrical in shape and has an upper end surface 20 and a lower end surface 22. Upper end surface 20 is interrupted by threaded socket 21 which receives the threaded end of rod 14. Body 12 also includes a side wall 26 which extends to lower end surface 22. A cavity 28 is formed in end surface 22. A slot 30 is formed in side wall 26 and has an end wall 32 which tapers from an upper point 34 in the surface of side wall 26 to a lower point 36 located in the center of body cavity 28. Ribs 38 extend radially inwardly from side wall 26 within cavity 28 and are spaced apart at their inner ends about lower point 36 of slot 30.

Body 12 has a transverse bore 40 which includes a reduced end portion 43 intersecting slot 30. Bore end portion 43 is separated from the remainder of bore 40 by an internal shoulder 42 and is spaced from body slot end wall 32 near the center of body cavity 28. A pin 46 having a collar 52 fits within bore 40 and extends across body slot 30 within bore reduced end portion 43. A helical spring 54 is compressed between collar 52 and a cap 44 threaded into bore 40 to urge pin 46 into its normal position transversely spanning slot 30 with its collar 52 bearing against bore shoulder 42.

To use retrieving device 10, pin 46 is manually retracted by grasping its exposed end to withdraw the pin from across body slot 30. Fishing line 56 to which a snagged lure 58 is attached is inserted into body slot 30 and pin 46 is released, as illustrated in FIGS. 2 and 4, with the line being held between the pin and body slot end wall 32. Body 12 is then guided by rod 14 along fishing line 56 to lure 58. Fishing line 56 extends along body slot 30 and exits near the center of body cavity 28. Due to such positioning of fishing line 56 within body cavity 28, lure 58 is positioned in the center of cavity 28 between body ribs 38 as body 12 is pushed by rod 14 to the lure along the fishing line. By pulling on fishing line 56, lure 58 may be snugged between ribs 38 for movement with body 12 and rod 14 to enable freeing of the lure from its snagged location.

It is to be understood that the invention is not to be limited by the above description but may be modified within the scope of the appended claims.

What I claim is:

1. A retrieving device adapted to free a snagged fishing lure connected to a fishing line, said retrieving device comprising a generally cylindrical body having an upper end surface and a lower end surface, an elongated rod connected rigidly to said body at its upper end surface, said body including a side wall extending to said lower end surface and defining an open cavity in the lower end surface, said body having a longitudinal slot extending through said side wall to the center of the body within said cavity, and shiftable spring tensioned means carried by said body and spanning said slot at a location spaced inwardly from the side wall and adjacent said cavity for retaining said fishing line within said slot generally centered within said cavity, said rod being connected at one end at the center of said body upper end surface, said slot increasing in depth from top to bottom and defined in part by an end wall tapering inwardly from the outer periphery of said body adjacent its said upper end surface to said center of the body within said cavity under said rod one end, whereby said body may be guided by said rod along the fishing line to said lure with the lure fitting into the cavity for subsequent movement with the body.

2. The retrieving device of claim 1 wherein said spring tensioned means includes a pin fitted into a transverse bore in said body above said cavity, said pin having a fishing line securing position with one end spanning said slot at a spaced location from said slot end wall, a spring urging said pin into its securing position, said pin being shiftable into a retracted position with its one end withdrawn from said slot to allow said fishing line to be inserted into the slot.

3. The retrieving device of claim 1 wherein said device includes inwardly projecting radially directed ribs extending from said side wall into said cavity and defining guide means for positioning the head of said fishing lure within said cavity, said ribs extending the full depth of said cavity.

* * * * *